(12) United States Patent
Mohan et al.

(10) Patent No.: US 11,362,827 B2
(45) Date of Patent: Jun. 14, 2022

(54) IOT SECURITY MECHANISMS FOR INDUSTRIAL APPLICATIONS

(71) Applicant: Schlumberger Technology Corporation, Sugar Land, TX (US)

(72) Inventors: Apurva Mohan, Sugar Land, TX (US); Anh Dang, Sugar Land, TX (US); Yusef Alaas, Sugar Land, TX (US); Martin Ernst, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 253 days.

(21) Appl. No.: 16/676,048

(22) Filed: Nov. 6, 2019

(65) Prior Publication Data

US 2020/0145213 A1 May 7, 2020

Related U.S. Application Data

(60) Provisional application No. 62/756,416, filed on Nov. 6, 2018.

(51) Int. Cl.
*H04L 29/06* (2006.01)
*H04L 9/32* (2006.01)
*H04L 9/40* (2022.01)

(52) U.S. Cl.
CPC .......... *H04L 9/3213* (2013.01); *H04L 9/3268* (2013.01); *H04L 63/0218* (2013.01); *H04L 63/102* (2013.01); *H04L 63/105* (2013.01); *H04L 63/20* (2013.01)

(58) Field of Classification Search
CPC ... H04L 9/3213; H04L 63/0218; H04L 63/20; H04L 9/3268; H04L 63/105; H04L 63/102; H04L 67/12; H04L 63/08; H04L 9/3247; H04L 9/0866; H04L 9/0894; G05B 2219/31255; G05B 19/4186
See application file for complete search history.

(56) References Cited

U.S. PATENT DOCUMENTS

| | | | | |
|---|---|---|---|---|
| 10,700,856 | B2* | 6/2020 | Nix | H04L 9/0662 |
| 2017/0054594 | A1* | 2/2017 | Decenzo | G08B 25/08 |
| 2019/0014117 | A1* | 1/2019 | Li | H04L 65/1073 |
| 2019/0319814 | A1* | 10/2019 | Das | H04W 72/0453 |
| 2019/0349426 | A1* | 11/2019 | Smith | H04W 4/08 |

(Continued)

OTHER PUBLICATIONS

A Mohan, DM Blough, "An attribute-based authorization policy framework with dynamic conflict resolution", -Proceedings of the 9th Symposium on Identity and Trust on the Internet, 2010 (14 pages).

(Continued)

*Primary Examiner* — Mahfuzur Rahman (57) ABSTRACT

The disclosure provides methods and systems for securing internet of thing systems. One method includes receiving, at a computing device, a token, wherein the token comprises a cryptographically signed list of rights that the computing device is authorized to request. The method also includes requesting, using the computing device, an action of a receiving device in an industrial location, wherein requesting the action comprises sending the token with the request to cause the receiving device to authenticate the user of the computing device and confirm the user is authorized to perform the action.

13 Claims, 11 Drawing Sheets

(56) References Cited

U.S. PATENT DOCUMENTS

2019/0386969 A1* 12/2019 Verzun .................. H04L 63/102
2021/0168132 A1*  6/2021 Smith ................. H04W 12/084
2021/0176638 A1*  6/2021 Heldt-Sheller ......... H04L 67/34

OTHER PUBLICATIONS

A Mohan et al., "A patient-centric, attribute-based, source-verifiable framework for health record sharing", Technical Report, Georgia Tech, 2009 (10 pages).

A Mohan et al., "Detection of Conflicts and Inconsistencies in Taxonomy-based Authorization Policies", 2011 IEEE International Conference on Bioinformatics and Biomedicine (BIBM), 2011 (5 pages).

A Mohan, "Design and implementation of an attribute-based authorization management system", , PhD Thesis, Geoergia Tech 2011 (145 pages).

* cited by examiner

IOT SECURITY MECHANISMS FOR INDUSTRIAL APPLICATIONS

BACKGROUND

The present disclosure relates generally to techniques for securing communications within industrial settings.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Industrial locations may utilize intermittent connections, low-bandwidth connections, and/or high-latency connections that may render user and device authentication as well as authorization of devices difficult both in authenticating initial connections and authorizing specific actions. Due to the devices in industrial settings generally having lower computing resources in addition to the intermittent connections, low-bandwidth connections, and/or high-latency connections, implementation of traditional authentication and authorization schemes that assume high bandwidth and high reliability connectivity may be untenable in the industrial setting. Additionally, industrial controllers have limited resources to protect the authentication credentials securely. This is especially relevant in settings where the IoT device is exposed to adversarial manipulation in its deployment environment.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Internet of things (IoT) devices are increasingly becoming ubiquitous and accessible. With increased connectivity, comes an increased need for security. For example, in some embodiments, a role-based model may be used to secure actions performed at an edge of one or more networks. Authenticating operational actions, such as valve actuation and data read using permissions inherited from information technology (IT) systems, adds a fine-grained layer of security deep into edge-of-network(s) data management and leads to clear security-based market differentiation.

Devices at edges of the one or more networks ("edge devices") may serve a very important purpose in an end-to-end IoT deployment. The edge devices may perform numerous functions, such as encompassing applications ranging from acquisition of data (e.g., from downhole tools), edge processing of data at the edge of the one or more networks, and/or other functions. In addition to such functions, edge devices may also be used to facilitate telemetry and control data flow between services and applications. Additionally, these devices are typically highly configurable. Actions like data read, control, and configuration changes are enabled only for authorized users.

As can be appreciated, these authorized actions are vital to the operation of IoT edge devices and to the assets connected to them. The restriction of these actions to authorized users is key to security and correct operations. To secure the authorized actions, a capability-based security scheme where every requesting device is authorized based on permissions allowed as indicated in a signed token provided by a requesting device. As discussed below, this capability-based security scheme may be more suited for various implementations (e.g., industrial settings) than permissions-based security schemes that receive requests then verify whether the device (e.g., user or hardware) is authorized to perform an action. Specifically, by moving authorization to a centrally managed service hosted in an IT environment separate from industrial networks utilizing low-bandwidth, intermittent, and/or high-latency connections without unduly increasing congestion. Furthermore, permissions-based access control methods may require role-to-privilege mapping in each edge device of the industrial networks thereby increasing demands on the edge devices. Moreover, the role-to-privilege mapping may be relatively static and may add administrative overhead. As discussed below, the capability-based security scheme many privileges are inherited from IT systems.

As will be discussed below, capability-based systems provide a highly scalable and decentralized authorization model where the actors privileges are included in a cryptographically protected capability token issued by a central IT system that is connected to the organization directory. One potential advantage of such systems is that privilege management for actors need not be included in the edge devices and may be provided by the requesting devices requesting to perform an action. The token may be dynamic so that the lifetime and capabilities can be renewed/updated dynamically. Actors that wish to perform privileged actions on an edge device may provide the cryptographically signed token to the edge device. In turn, the edge device may validate the token and grant the permissions that are included in the token to the requested device.

The capability-based system may enable a highly secure, dynamic, and decentralized authorization system that may protect privileged actions in the field environment without the burden of authorization management on the IoT device serving as an edge device to a requesting device. In some embodiments, the capability-based system may leverage strong cryptography and may enable enforcement of strong authentication and authorization within the same verification process based on cryptographically established trust via a cryptographically signed token. This use of the token makes the authorization more efficient and more properly suited for industrial settings (e.g., oil field).

Figure 1:
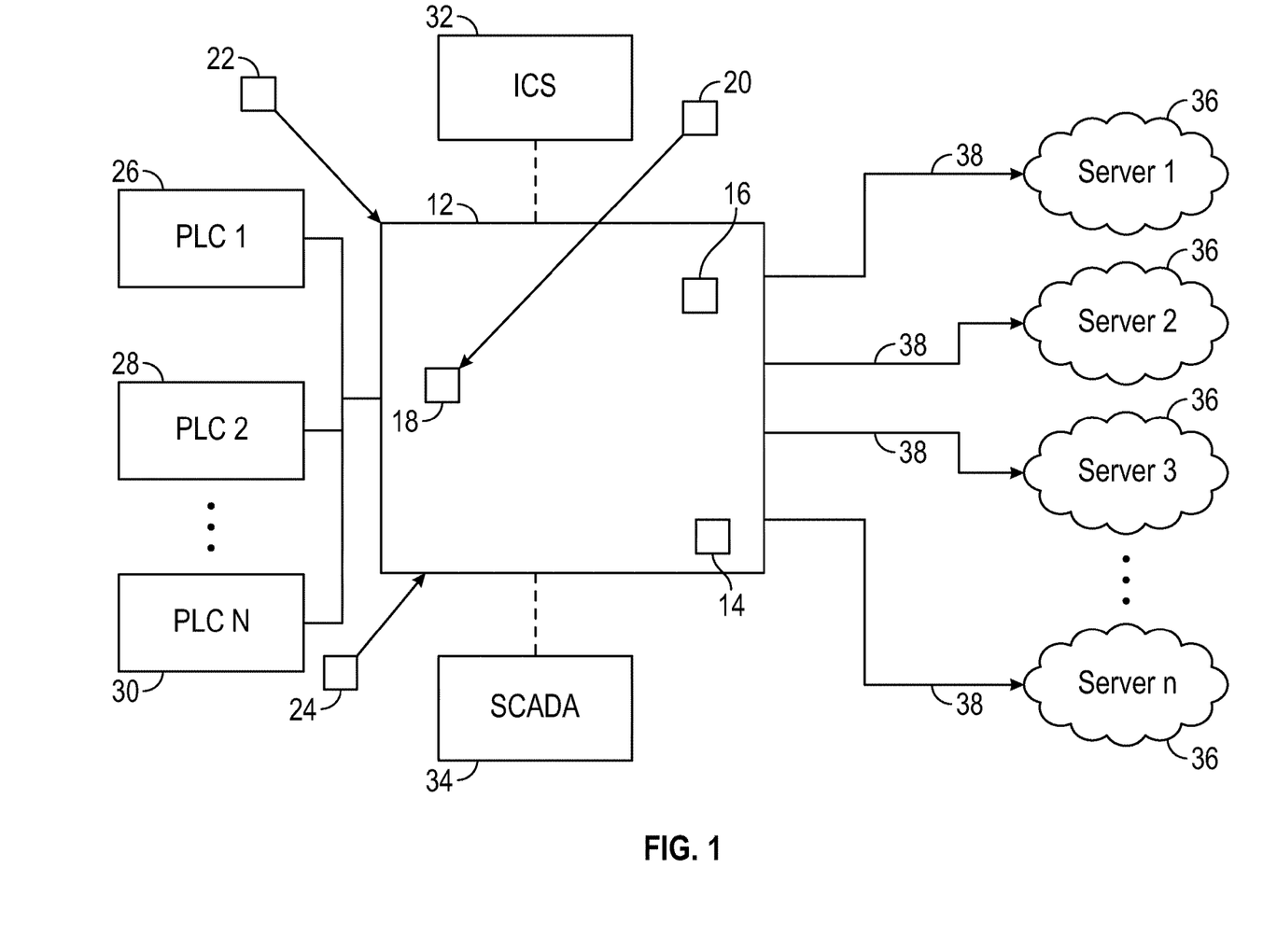
FIG. 1 is a block diagram of system including one or more networks each including one or more devices, in accordance with an embodiment.

FIG. 1 is a block diagram of a system 10 that includes one or more networks 12. The network(s) 12 may include one or more physical networks having different network connection protocols. For example, the network(s) 12 may include IEEE 802.1 (LAN interconnection) connections, IEEE 802.3 (Ethernet) connections, IEEE 802.11 (wireless LAN, WiFi, mesh network) connections, IEEE 802.15.1 (Bluetooth) connections, IEEE 802.15.3 (high-rate PAN) connections, IEEE 802.15.4 (low-rate PAN) connections, satellite connections, and/or other suitable communication protocols. The network(s) 12 may include any number of devices. For instance, the illustrated embodiment of the network(s) 12 includes devices 14, 16, and 18. The devices 14, 16, and 18 may be any device that communicates over the network(s) 12.

In some embodiments, the network(s) 12 may have one or more devices (e.g., devices 20, 22, and 24) that couple to and/or attempt to couple to the network(s) 12. For example, the device 20 may include a tablet, laptop, or other mobile computing device that attempts to couple and/or couples to the network(s) 12 via the device 18. As discussed below, the coupling of the device 20 to the network(s) 12 may include a capabilities-based authorization. The network(s) 12 may include or be coupled to any number of programmable logic controllers (PLCs) 26, 28, and 30. As may be appreciated, the PLCs, such as PLCs 26, 28, and 30 may be used to control industrial equipment, such as oil field equipment, manufacturing equipment, and/or other industrial equipment. Additionally, the network(s) 12 may include or be coupled to an industrial control system (ICS) 32. The ICS 32 may be any control system and/or associated instrumentation used for industrial process control. Additionally or alternatively, the network(s) 12 may include or be coupled to a supervisory control and data acquisition (SCADA) control system that uses the PLCs and the devices 14, 16, and 18 to manage operations in an industrial field. Furthermore, the network(s) 12 may utilize one or more services 36 over network connections 38. For example, the services 36 may include remote services provided by an owner and/or operator of the network(s) 12, remote services provided by a third-party other than the owner and/or operator of the network(s) 12, remote services provided to the owner and/or operator of the network(s) 12 and managed by the owner and/or operator the network(s) 12, and/or any other services. For instance, the services 36 may include data storage for the network(s) 12, data processing and/or analysis for the network(s) 12, and/or any other suitable remote services. In some embodiments, the network connections 38 may be over various protocol types, such as any of the type of connections used by the network(s) 12, the Internet, and/or any other suitable type of connections. In some embodiments, a gateway device used to connect to the services 36 may enable only single direction (e.g., outbound) connections to trusted locations with no exposed services to external networks other than those initiated by the gateway device. However, local services may be exposed on the gateway device for locally connected devices without providing availability to outside networks. In other words, in such embodiments, the gateway device enables only initiation of outbound communications to the services 36 and blocks initiation of inbound communications from the services 36.

Figure 2:
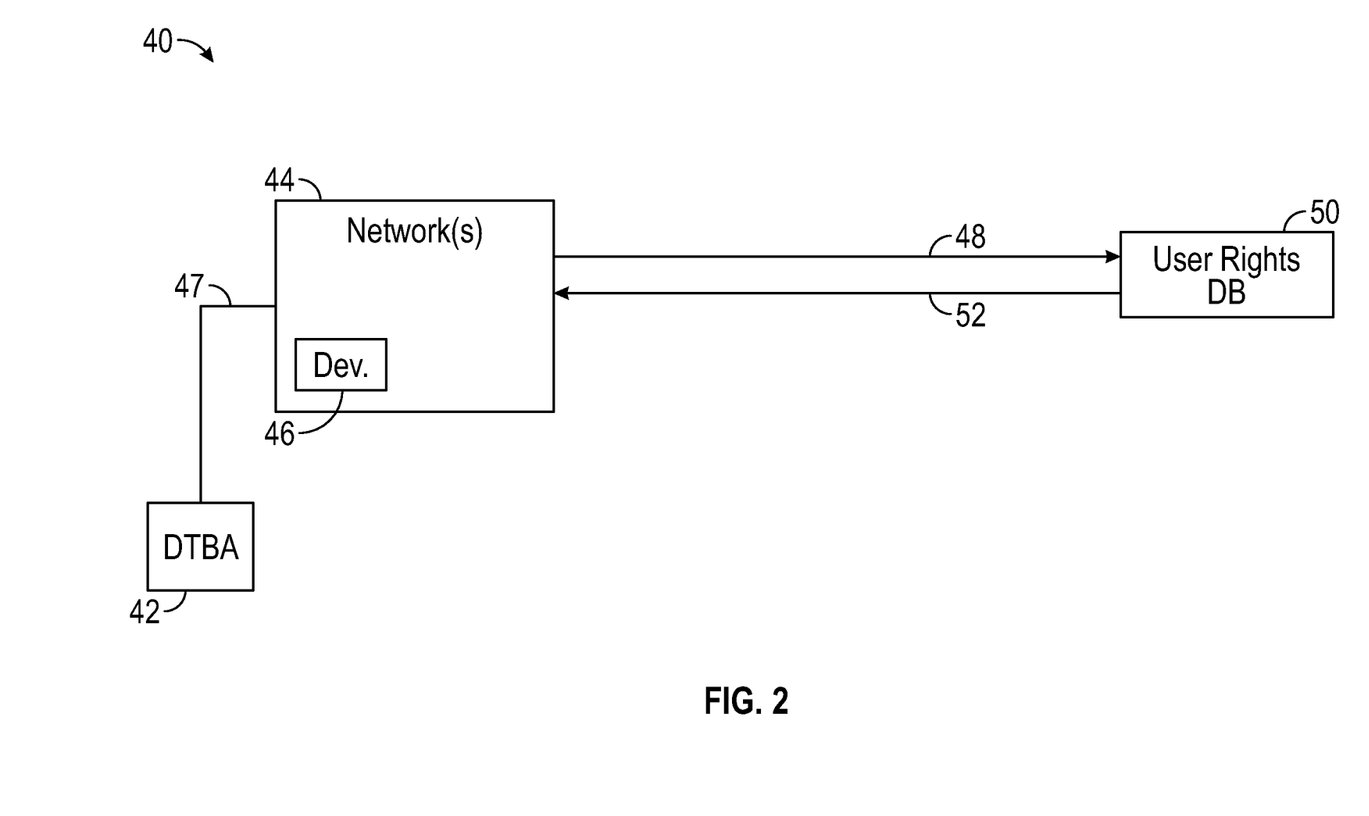
FIG. 2 is a block diagram of an authorization scheme that may be used to authorize action of device to be authorized on one or more of the networks of FIG. 1, in accordance with an embodiment.

When the device 20 attempts to perform an operation or task on a device (e.g., the device 18) of the network(s) 12, the operation or task may first be authorized via the network (e.g., via the device 18). FIG. 2 illustrates a block diagram of an authorization scheme that may be used to authorize actions of a device to be authorized (DTBA) 42 on one or more network(s) 44 via a device 46 of the one or more network(s) 44. The DTBA 42 sends a request to the device 46 requesting to perform an action or operation that requires authorization in the one or more network(s) 44. The network (s) 44 (e.g., via the device 46) may send a request 48 to a user rights database 50 that tracks which users are permitted to perform which actions, and the user rights database 50 may send a result 52 indicating whether the action or operation is authorized for the DTBA 42. The user rights database 50 may be stored locally in the network(s) 44. However, this local storage of the user rights database 50 may consume resources that may be limited or unavailable in an industrial setting. Additionally or alternatively, the user rights database 50 may be stored remote from the one or more network(s) 44. However, connections from the network(s) 44 in an industrial setting may utilize relatively low bandwidth, intermittent, and/or high-latency connections (e.g., satellite connections) that may make such remote authorizations difficult or even untenable in the industrial setting.

Figure 3:
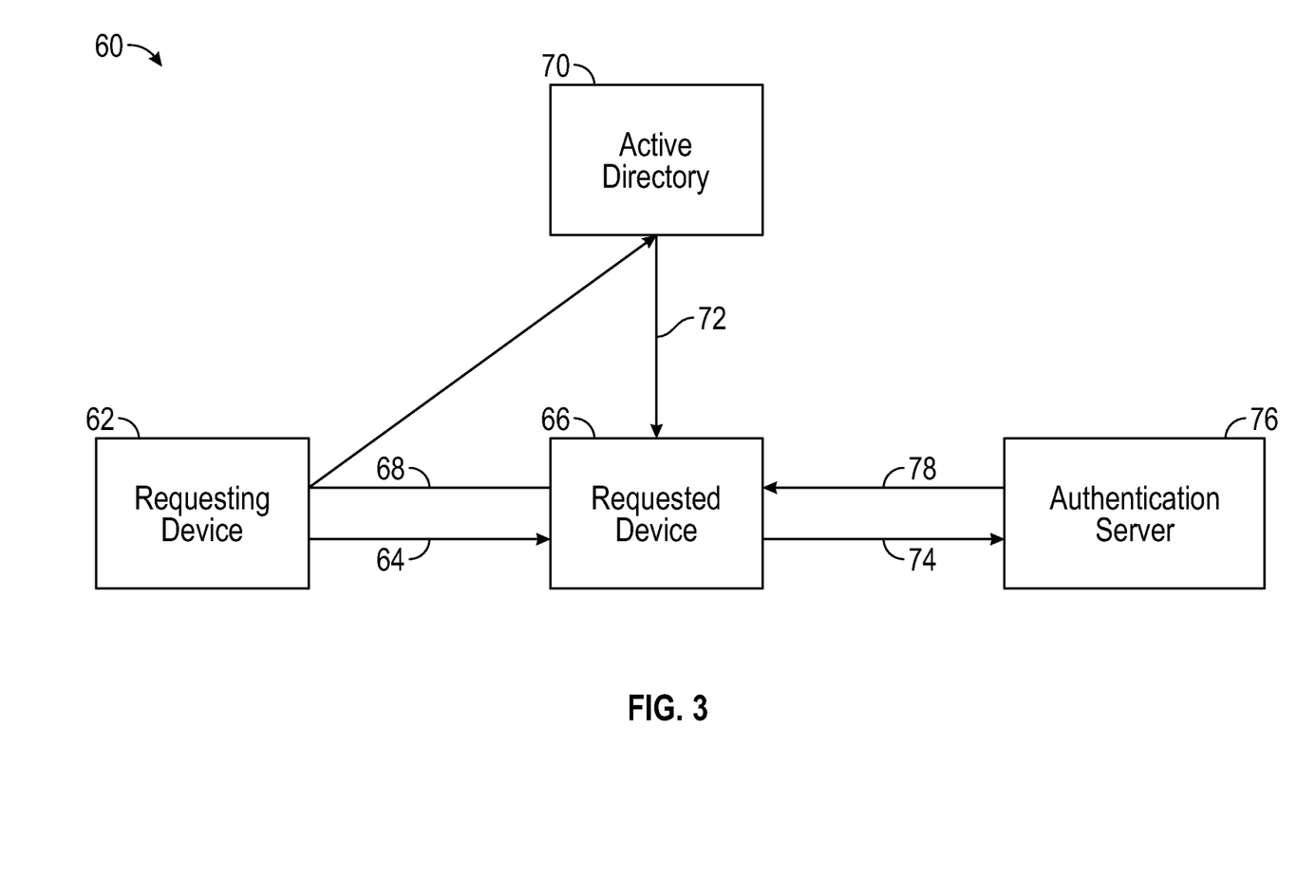
FIG. 3 is a flow diagram of an embodiment of communication interaction during authorization of a requesting device using a permission-based scheme to authorize a device on the one or more networks of FIG. 1, in accordance with an embodiment.

FIG. 3 is a flow diagram of an embodiment of communication interaction 60 during authorization of a requesting device 62 using a permission-based scheme. The requesting device 62 sends a request 64 to a requested device 66 (e.g., IoT device) to perform an action. The requested device 66 sends instructions 68 to the requesting device 62 to cause the requesting device 62 to contact an active directory 70 that includes the user rights for the requesting device 62. In some embodiments, when the requesting device 62 contacts the active directory 70, the requesting device 62 sends basic authorization information, such as a username and password. The active directory 70 then sends a permission indicator 72 for the requesting device 62 to the requested device 66. The permission indicator may also be sent back to the requesting device 62 in the form of a signed token. The requested device 66 may additionally send an authentication request 74 to an authentication server 76 that may be used to verify whether the permission indicator 72 is authentic. The authentication server 76 then returns an authenticity indicator 78 to the requested device 66. If the permission indicator 72 indicates that the requesting device 62 is permitted to perform the action and the authentication indicator 78 indicates that the permission indicator 72 is authentic, the requested device 66 may perform the action. Otherwise, the requesting device 62 is not deemed as authorized to perform the action.

Figure 4:
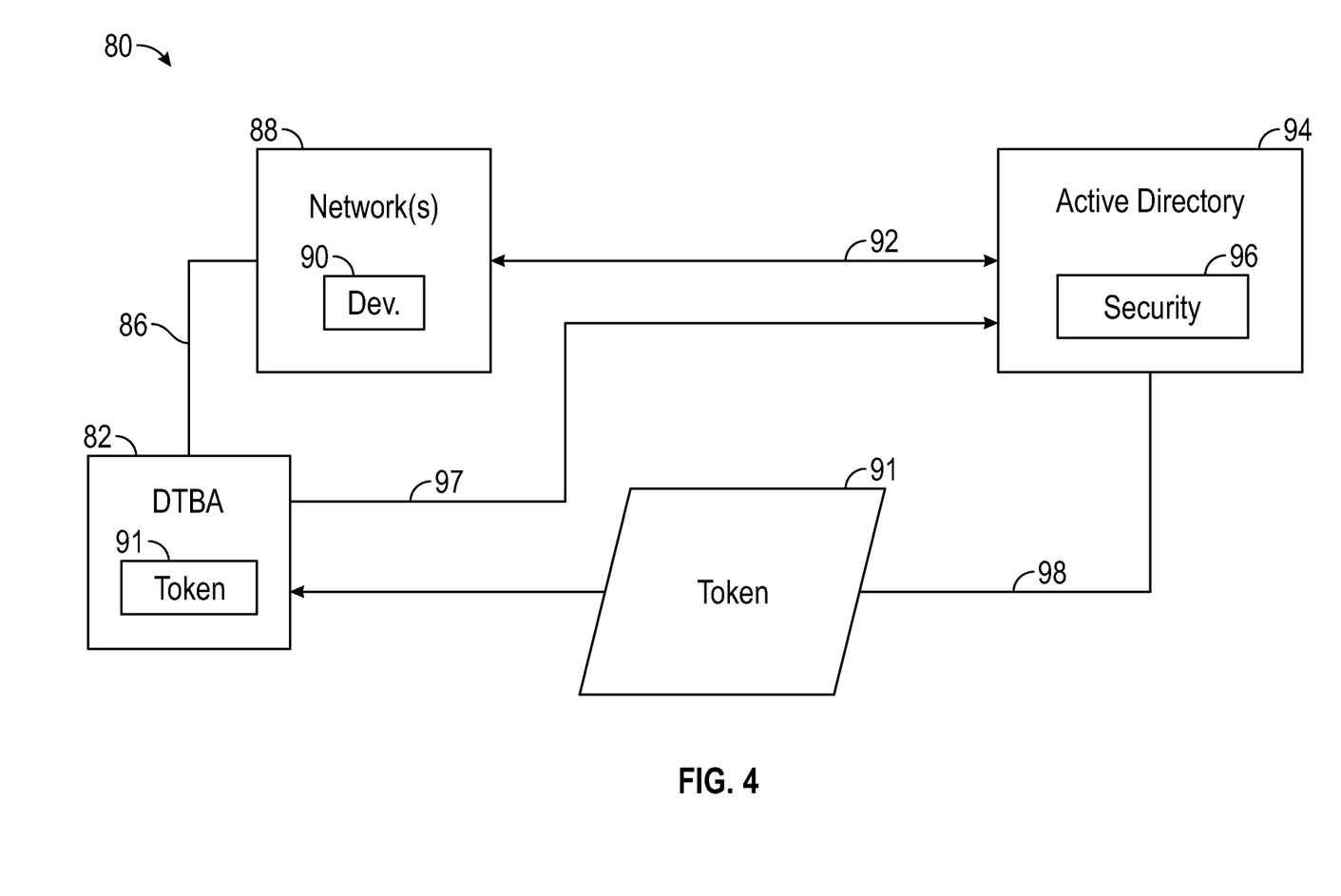
FIG. 4 is a flow diagram of an embodiment of communication interaction during authorization of a requesting device using a capability-based scheme to authorize a device on the one or more networks of FIG. 1, in accordance with an embodiment.

FIG. 4 is block diagram of a capability-based scheme 80. When a device-to-be-authorized (DTBA) 82 connects to a network(s) 88, such as through device 90 of the network(s) 88, the DTBA 82 sends a token 91 to the device 90. The token 91 includes a list of access rights and/or actions that the DTBA 82 is authorized to perform/access. The token 91 may also include other information, such as the role that the DTBA 82 (or an associated user) is to perform or other token attributes for the token 91 and/or information about where the token 91 was generated and/or signed. Furthermore, the token 91 may include security information that may be used to authenticate the list and/or the role. For example, in some embodiments, the token 91 may be cryptographically signed using a signature and/or utilizing a public key. The device 90 may check the signature of the token 91 against a private key to ensure that the signature is valid. Once the signature is validated using the private key in the device 90, the list is validated. This is because validation of the signature indicates that the list is valid since the list is signed using the validated signature.

As previously discussed, the active directory 94 may store user rights for the network(s) 88. The active directory 94 may also include security 96 that may be used to generate the token 91. For example, as previously discussed, the security 96 may include private and public keys that are used to authenticate a list of capable actions (e.g., permitted actions) and/or roles included in the token. The active directory 94 may generate the token 91 and/or its list in response to a request 97 from the DTBA 82. This request 97 may be sent using connections that are not available via the network(s) 88. For example, the DTBA 82 may connect to the active directory 94 using a relatively high-bandwidth connection (e.g., Ethernet or WiFi) before entering an industrial field that includes the network(s) 88. In other words, the DTBA 82 may include a mobile device that is "pre-loaded" with the token 91 from the active directory 94 before entering the field having the network(s) 88. In some embodiments, the request 97 may include authorization information, such as usernames, passwords, roles, and/or other information about planned/permitted use by the DBTA 82 (or its associated user/operator). In response to the request 97, the active directory 94 sends the token 91 to the DTBA 82 to later authorize actions within the network(s) 88.

As can be appreciated, by shifting storage of user capabilities off of the device 90, the storage capacity for one or more edge devices may be greatly reduced. Instead, at least one of the edge devices may instead decrypt the token 91 to determine whether the DTBA 82 is authorized to perform with relatively small processing requirements that are suitable for embedded device computation in an industrial setting. Furthermore, by decrypting the capabilities of the DTBA 82 at the edge device, the edge device may perform authorization without use of relatively large data communications that may be difficult and/or untenable in an industrial setting.

Figure 5:
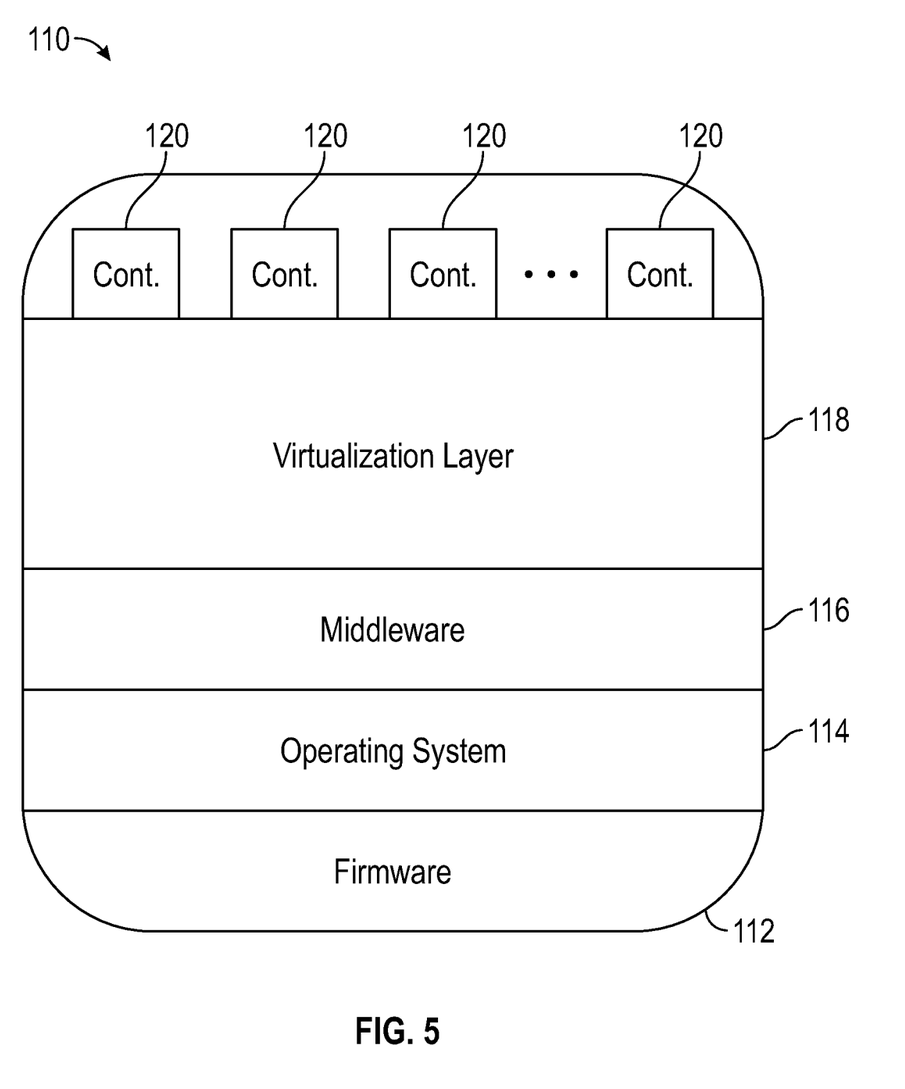
FIG. 5 is a block diagram of a model that may be employed in a gateway/edge device of the one or more networks of FIG. 1, in accordance with an embodiment.

The security features of the edge device may be performed in a compartmentalized manner. For instance, FIG. 5 is a block diagram of a model 110 that may be employed in the edge device and/or gateway. The model 110 shows firmware provides low-level control for hardware of the edge device/gateway. The model 112 also includes an operating system 114 that supports functions of the edge device/gateway, such as scheduling tasks, executing applications, controlling peripherals, and/or other suitable actions. On top of the operating system 114, there is middleware 116 that acts a bridge between the operating system 114 and applications/a virtualization layer 118. The virtualization layer 118 may include one or more programs that perform operating-system-level-virtualization using software packages as containers 120. For example, the virtualization layer 118 may run DOCKER® provided by DOCKER, INC. as a program that runs programs in the containers 120. For example, one conta. 120 runs a se and application, a second container 120 runs a database server that is used by the application, and a third container 120 runs a security program.

The containers 120 are isolated from each other and bundle their own tools, libraries, and configuration files to isolate the containers 120 from most of the gateway/edge devices. The containers 120 are able to communicate with each other through well-defined channels. In some embodiments, each of the containers 120 are run by a single operating system kernel and may be more lightweight than virtual machines. The containers 120 may be created from images that specify the precise contents of the containers 120. The images may be created by combining and modifying images downloaded from online repositories. The security container 120 may be used to integrate native and/or third-party managed security services. The security services may include software-based firewalls, monitoring solutions, and the like. Using the containers 120, these services may be integrated within the gateway/edge device. The security agent container 120 (via the virtualization layer 118) may analyze all communications in the middleware 116 and the operating system 114. Threats may be captured in the communications and sent back to a service (e.g., services 36). In some embodiments, the security agent container 120 may process/filter threats to only include some cases to alleviate bandwidth demands over the network connections 38. For example, a score may be applied to each threat, and only those that surpass a threshold may be transmitted over the network connections 38 to the corresponding service 36. By filtering such communications, congestion of the relatively low-bandwidth, intermittent, and/or high-latency network connections 38 may be at least partially alleviated for non-important events. In some embodiments, the scoring of threats may be set such that receipts of more indicators for the same threat causes the threat to be scored more highly. Additionally or alternatively, when the threat relates to a higher impact, the threat may be scored more highly. Additionally or alternatively, threats may be scored based at least in part on domains.

The scoring may be at least partially processed on edge devices since edge devices may have more processing resources than embedded devices. In some embodiments, after processing, events surpassing the threshold may be recorded in the logs and sent to corresponding service 36. The scoring techniques may be made to balance between sending excessive information to the service 36 and discarding potentially valuable information. To accommodate the potential intermittency of the network connections 38 in some embodiments, the edge devices/gateways may be configured to generate local alerts during disconnection to a corresponding security service 36. In some embodiments after a disconnection, the gateway/edge devices may send current data and transmit backlogged data during periods of available transmission over the network connections 38.

In addition to or alternative to the capability-based authorization scheme, the network(s) 12 and/or 88 may utilize adaptive authentication that authorizes access to gateway devices by external devices, such as the devices 20, 22, and 24 based on authentication context and available infrastructure to customize authentication to secure access to the gateway devices. For example, the adaptive infrastructure may vary authentication based on whether the requesting device is connected to a certificate-based local network, disconnected from any local networks, or coupled to a password-based local network. Adaptive authentication senses the environment in real-time and imposes authentication requirements on user(s) and/or device(s) based on the environment parameters returned. Adaptive authentication takes into account a level of trust that the system places on the environmental parameters like trust in the network from where the user/device is authenticating, user/device origin, spatio/temporal constraints, and the like. The system can increase authentication requirements if lower trust is placed in the environmental parameters. Examples of increased authentication requirements nay include use of additional authentication factors or use of enhanced network security services to enable authentication.

Figure 6:
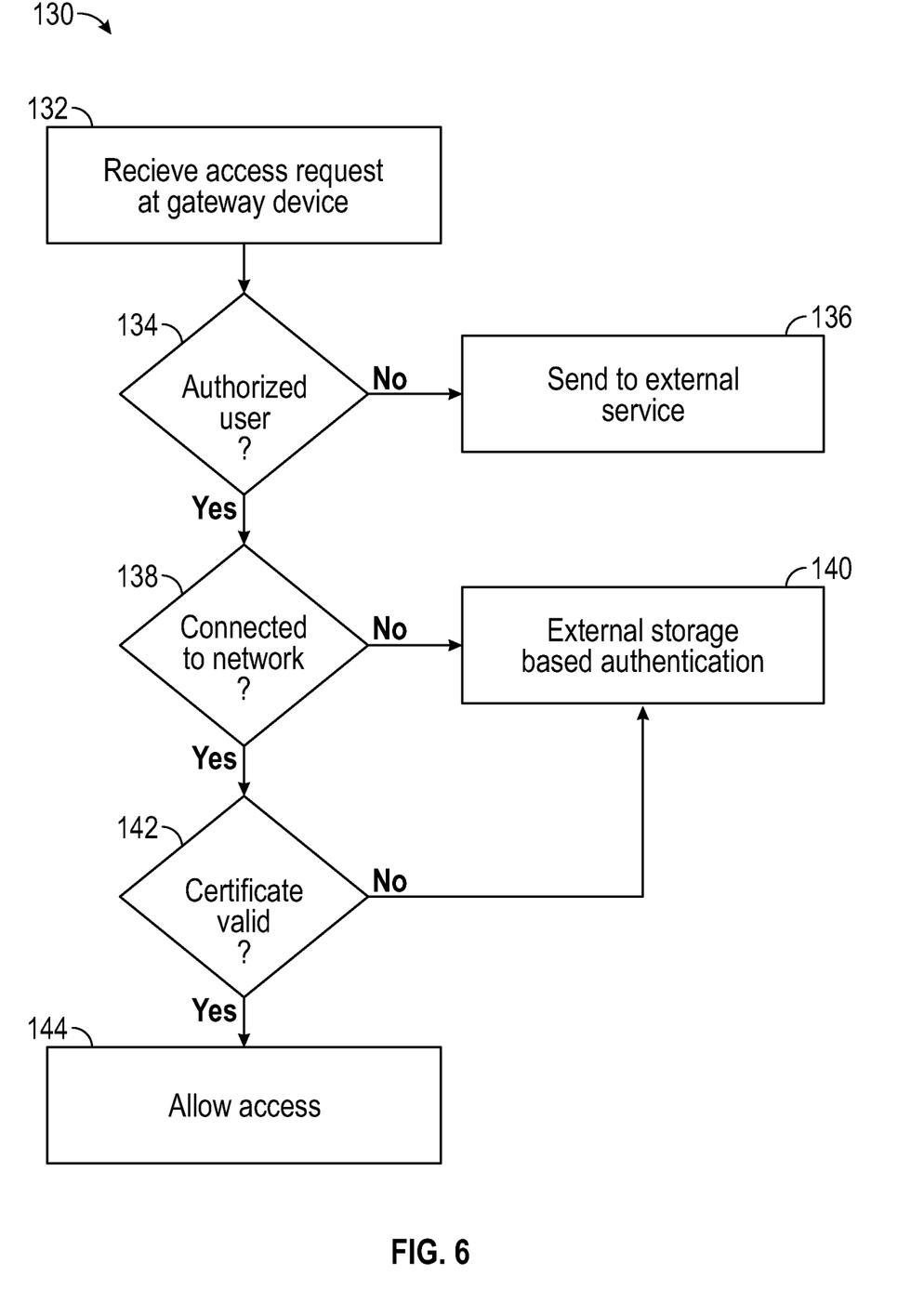
FIG. 6 is a flowchart of a process used to authenticate devices requesting access to the gateway/edge devices of the one or more networks of FIG. 1, in accordance with an embodiment.

FIG. 6 illustrates a flowchart of a process 130 used to authenticate devices (e.g., devices 20, 22, 24, 42, 62, and 82) to gateway/edge devices. The gateway/edge device receives an access request to connect to the gateway/edge device (block 132). The gateway/edge device determines whether the requesting device is associated with an authorized user (e.g., employee) of locally connected networks (block 134). For instance, the gateway/edge device may determine whether the requesting device has a username, password, SSID, network password, and/or other information used to indicate whether the user is authorized for one or more connected networks. If the requesting device is not associated with an authorized user, the gateway/edge device redirects or routes the requesting device to an external service (block 136) or direct use of external-storage-based authentication 140. This may occur when the gateway/edge device determines that it is connected to a service 36 corresponding to the requesting device (e.g., to authorize the device connecting the gateway/edge device). Additionally, or alternatively, the gateway/edge device may send an error message back to the requesting device denying authentication.

If the gateway/edge device determines that the requesting device is authorized, the gateway/edge device may then determine whether the requesting device is connected to one of the local networks (block 138). As previously discussed, the local networks may include certificate-based networks and/or password-based networks. If the requesting device is not connected to one of the local networks, the gateway/edge device may request that the device perform external-storage-based authentication (block 140). For example, the requesting device may use a key stored external to the gateway/edge device. For instance, the requesting device may have stored, internally in memory or externally (e.g., USB flash memory), a private key that may be checked against a public key stored in the gateway/edge device to ensure that the requesting device is authorized to access the gateway/edge device. If the keys match, the gateway/edge device may allow the requesting device to connect to the gateway/edge device. If the requesting device is coupled to one or more of the local network(s), the gateway/edge device may determine whether a certificate is valid (block 142). For example, if the local network is a certificate-based network, connection to the local network may be sufficient to deem that the certificate is valid. Additionally or alternatively, the local network may not use a certificate used to authorize access to the gateway/edge device. For instance, the local network may use non-certificate security (e.g., passwords). In such embodiments, the gateway may utilize a certificate-based authorization scheme to authorize the requesting device to connect to the gateway/edge device. If the certificate is valid, access to the gateway/edge device is allowed (block 144). If the certificate fails, the gateway/edge device instructs the requesting device to utilize the external-storage-based authentication. If the external-storage-based authentication fails, regardless of when the external-storage-based authentication is initiated, the gateway/edge device may deny access to the gateway/edge device from the requesting device. Thus, when the requesting device requests access to the gateway/edge device, the gateway/edge device may offload some of the burden of processing whether the access should be allowed to the local networks and/or external services based on context of the requesting device. Offloading the certification may also reduce the ability for an attacker to compromise user accounts at the gateway/edge device. When no available connected local network is able to certify the requesting device, the gateway/edge device may perform certification of the requesting device by forwarding a certificate to determine whether the requesting device is to be allowed access to the gateway/edge device. In some embodiments, the access certification may also be used to automatically map the role for capable actions. Additionally or alternatively, the capability-based authentication may utilize a separate authentication/certification process.

Figure 7:
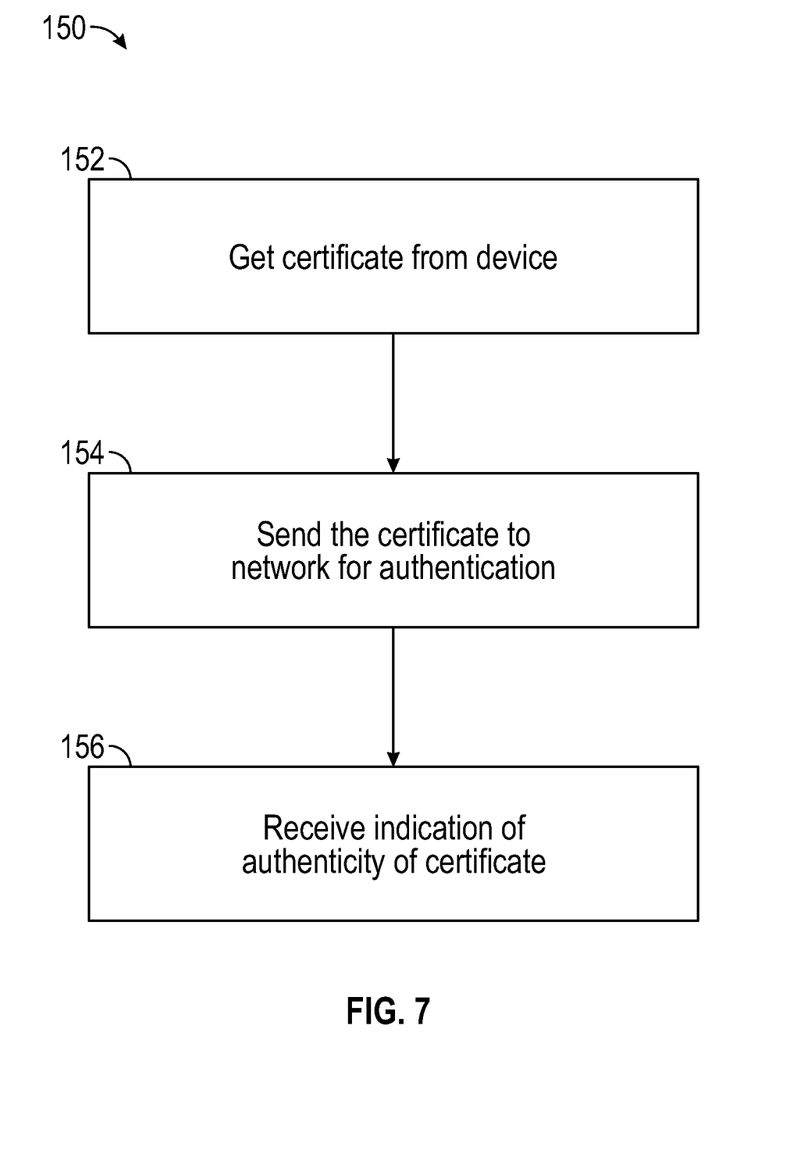
FIG. 7 is a flow diagram of a certification process that may be used in the process of FIG. 6, in accordance with an embodiment.

FIG. 7 is a flow diagram of a certification process 150 that may be used by the gateway/edge device (e.g., block 142). The gateway/edge device gets a certificate from the requesting device (block 152). The gateway/edge device may send the certificate to a company network (e.g., one of the local networks or remote service) to check the certificate (block 154). The gateway/edge device then receives an indication of authenticity of the certificate from the company network (block 156). The indication is used by the gateway/edge device to determine whether certificate is valid. Thus, as previously discussed, certification of the requesting device is offloaded to a local network via certificate forwarding from the gateway/edge device reducing potential computation load on and potential security risk to the gateway/edge device due to the requesting device.

Figure 8:
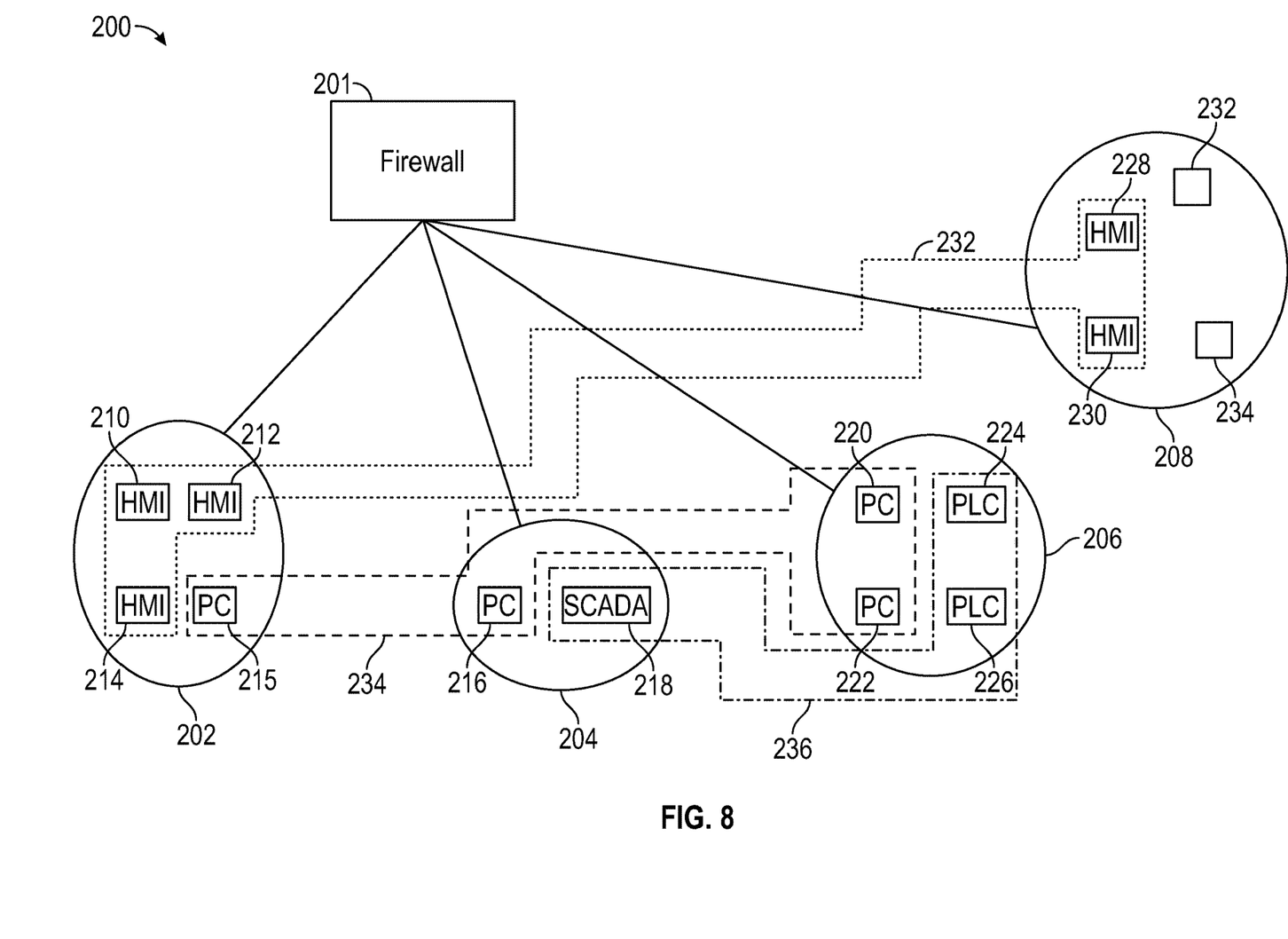
FIG. 8 is a block diagram of the system of FIG. 1 with devices organized into functional zones, in accordance with an embodiment.

In addition to or alternative to the capability-based authorization and/or the adaptive authentication, the system 10 may utilize functional network zones using micro-segmentation to divide the zones into different functions. FIG. 8 is a block diagram of a system 200 (e.g., the system 10) that includes a firewall 201 and four networks 202, 204, 206, and 208. Each of the networks may include a corresponding network protocol. For example, the network(s) 12 may include IEEE 802.1 (LAN interconnection) connections, IEEE 802.3 (Ethernet) connections, IEEE 802.11 (wireless LAN, WiFi, mesh network) connections, IEEE 802.15.1 (Bluetooth) connections, IEEE 802.15.3 (high-rate PAN) connections, IEEE 802.15.4 (low-rate PAN) connections, satellite connections, and/or other suitable communication protocols. The network 202 includes human-machine interfaces (HMI) 210, 212, and 214 and a PC 215. The network 204 includes a PC 216 and a supervisory control and data acquisition (SCADA) control system 218. The network 206 includes PCs 220 and 222 and programmable logic controllers (PLCs) 224 and 226. The network 208 includes HMIs 228 and 230 and other devices 232 and 234. In some embodiments, at least one device may be present on more than one of the networks 202, 204, 206, and 208. All of the devices in the networks 202, 204, 206, and 208 may be organized into functional zones by attributes, functions, posture (location), or other common traits of devices regardless of which network the devices are located within. For example, the HMIs 210, 212, 214, 228, and 230 may be organized into single functional zone 242. The PCs 205, 216, 220, and 220 may be organized into another functional zone 244. The SCADA control system 218 and the PLCs 224 and 226 may be organized into yet another functional zone 246. The system 200 may have certain rules regarding communication and authentication. For example, the system 200 may require authentication when communicating between functional groups and/or may block certain message types between functional zones while permitting those same message types within a single group.

To implement these rules, the firewall 201 may be a next-generation firewall that provides network device filtering using in-line deep packet inspection (DPI), an intrusion prevention system (IPS), transport layer security (TLS) encrypted traffic inspection, secure sockets layer (SSL) encrypted traffic inspection, website filtering, or other techniques. The firewall 201 may dynamically enable joining of devices to a corresponding functional zone and removing of devices from a functional zone (e.g., based on syntax). In some embodiments, the firewall 201 may allow any messages within a functional zone while treating messages between functional zones as requiring verification of every communication between functional zones. Alternatively, the firewall 201 may require verification of each communication between functional zones.

Figure 9:
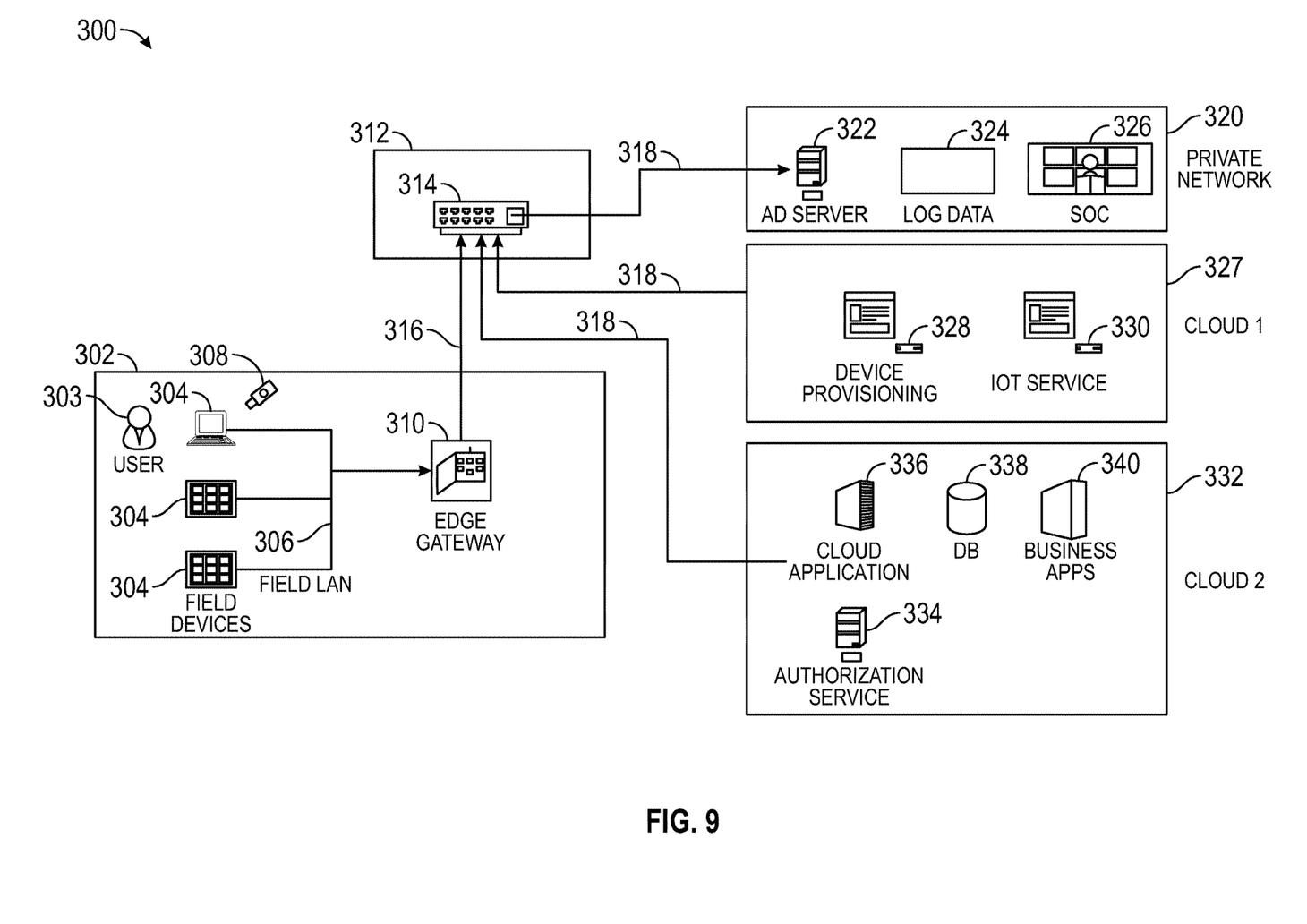
FIG. 9 is a block diagram of an example of the system of FIG. 1, in accordance with an embodiment.

FIG. 9 is a block diagram of an embodiment of the system 300. The system 300 may be an example embodiment of the system 10. The system 300 includes an industrial location 302, such as an oil field or other industrial location. A user 303 may utilize one or more field devices 304 to connect to one or more field local area networks (LANs) 306. The LAN(s) 306 connect to an edge gateway 310 that may be used to connect to an external network 312. The external network 312 may include a firewall 314. Furthermore, the external network 312 may be located in or near the industrial location 302 and/or may be located remote from the industrial location 302.

The LANs 306 may include IEEE 802.1 (LAN interconnection) connections, IEEE 802.3 (Ethernet) connections, IEEE 802.11 (wireless LAN, WiFi, mesh network) connections, IEEE 802.15.1 (Bluetooth) connections, IEEE 802.15.3 (high-rate PAN) connections, IEEE 802.15.4 (low-rate PAN) connections, satellite connections, and/or other suitable communication protocols. The LAN(s) 306 may include any number of devices. The edge gateway 310 may couple to the firewall 314 via a similar or different connection type. For instance, a connection 316 between the edge gateway 310 and the firewall 314 may include a cellular (e.g., LTE) connection, a satellite connection, or another connection type that may have a lower bandwidth and/or higher latency that the connections within the LAN(s) 306.

The firewall 314 may couple the edge gateway 310 to remote services 36 (e.g., services 320) via one or more connections 318. For instance, these connections 318 may include utilize hyper text transfer protocol secure (HTTPS) connections, message queuing telemetry transport for sensor networks (MQTT-S), and/or other communication protocols.

The service 320 may be a private information network provided by an owner of one or more of the LAN(s) 306 to provide remote computing capabilities. For instance, the service 320 may include an active directory server 322 to perform the active directory functions discussed herein. The service 320 may also store log data 324. For instance, the service 320 may utilize SPLUNK® or another security information and event management (SIEM) system to log events. The service 320 may also include a security operations center (SOC) 326 to handle security issues on an organizational and/or technical level.

The firewall 314 may also communicate with a cloud service 327 to handle other functions. For instance, the cloud service 327 may provide device provisioning 328 and an Internet-of-Things (IoT) service 330. The cloud service 327 may be implemented using one or more suitable cloud platforms. For instance, the cloud service 327 is implemented using a first commercially available cloud.

The firewall 332 may also communicate with a cloud service 332 to handle additional functions. For instance, the cloud service 332 may provide authorization services 334 for the industrial location 302 as discussed herein. The cloud service 332 may also include cloud applications 336 installed on a cluster of the cloud service 332 that provides an infrastructure as a service cloud. The cloud service 332 may also include a database 338 to store information from the field devices 304. The cloud service 332 may also include and/or provide one or more business applications 340 via the gateway 314. The cloud service 332 may be implemented using one or more suitable cloud platforms. For instance, the cloud service 332 may be implemented using a second commercially available cloud.

Figure 10A:
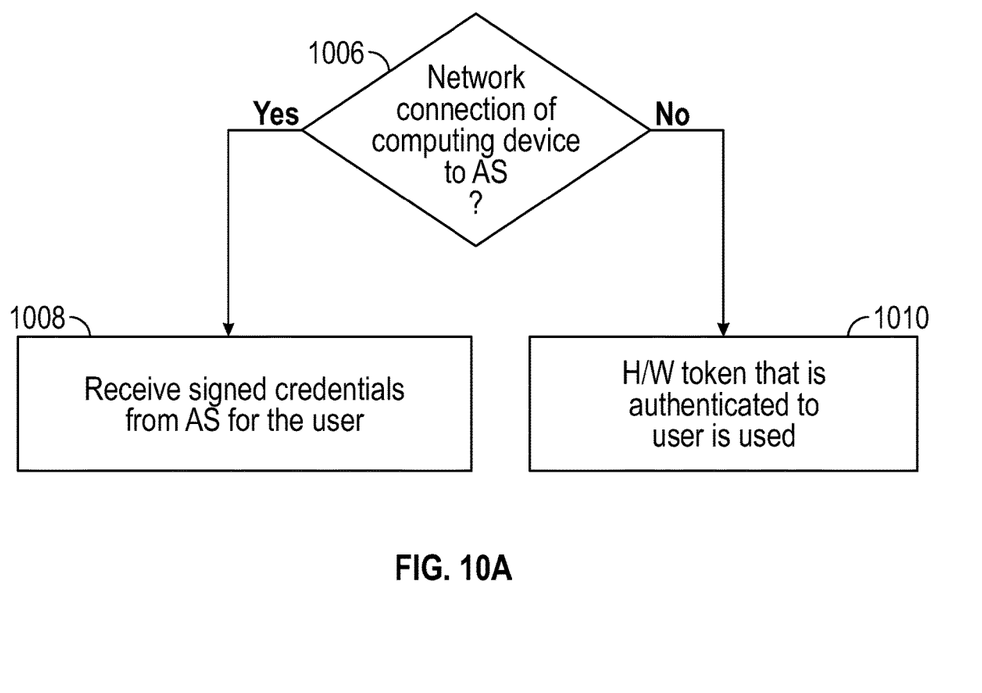
FIG. 10A is a flowchart of a process used to authenticate devices requesting access to the gateway/edge devices of the one or more networks of FIG. 1, in accordance with an embodiment.

FIG. 10 is a flowchart of a process used to authenticate devices requesting access to the gateway/edge devices of the one or more networks of FIG. 1, in accordance with an embodiment. In one or more embodiments, an authentication server ("AS") can be used to provide an authorized user authentication credentials. If the user has a computing device connected to the AS the AS can provide the computing device signed credentials that correspond to the user, box 1008; however, if the user is does not have a computing device connected to the AS, the user can obtain a hardware token that is authenticated to the user, e.g., provided on a thumb drive that has an authentication key that the AS recognizes.

Figure 10B:
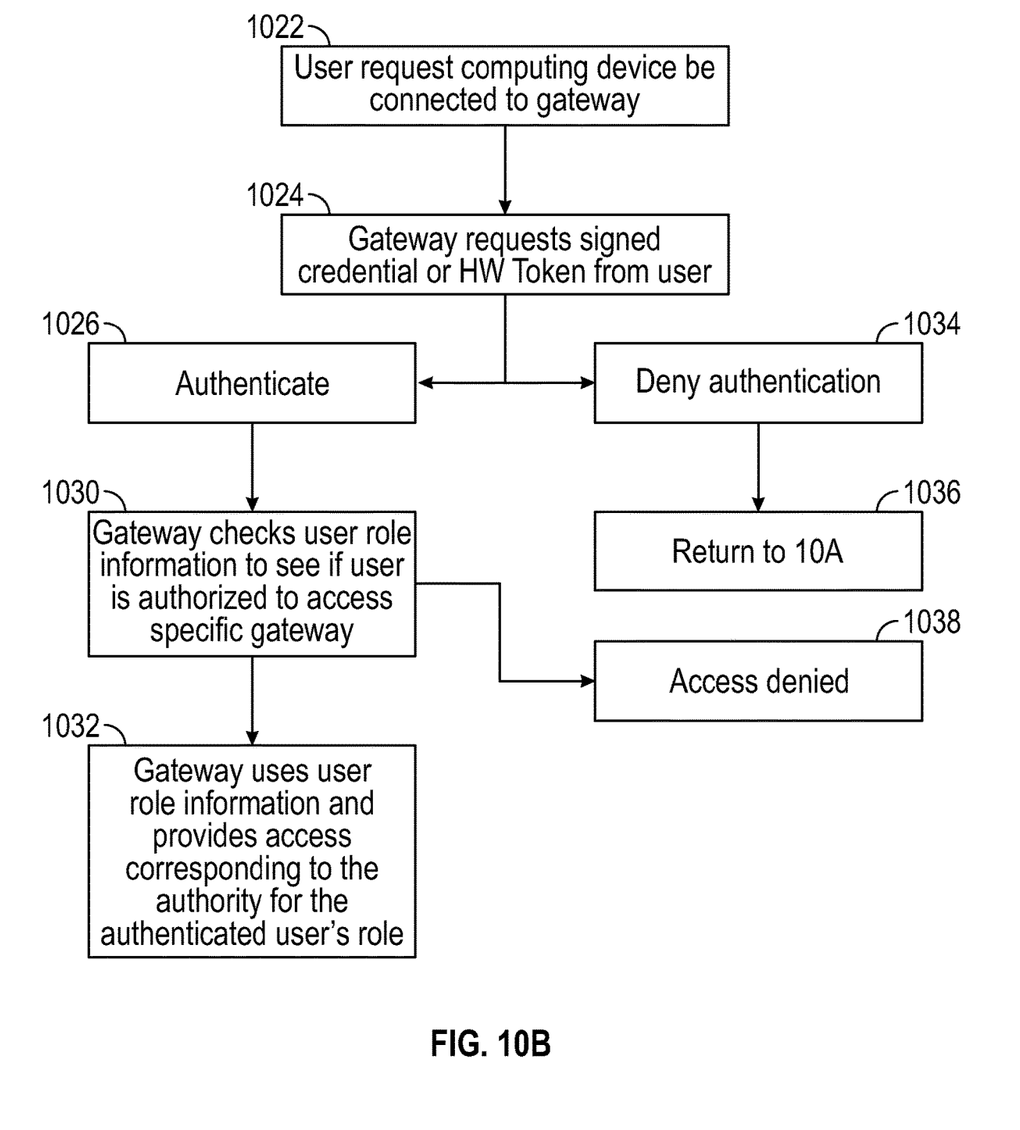
FIG. 10B shows the process of admitting the user access to a gateway.

FIG. 10B shows the process of admitting the user access to a gateway. In box 1022, the user requests that the gateway connects to the users computing device. The gateway will ask the user to provide either the signed credential loaded on the computing device from the AS or to provide the HW token with the authentication key, box 1024.

The user will provide the requested token or credential and the gateway will verify in real-time with the AS and confirm that the a credentials proper, or if hardware token (which can be referred above to as credentials as well) the user will use the device the user want to connect to the gateway and provide the hardware token to a webservice in communication with the gateway and the gateway will determine if the hardware token is valid, as shown in box 1026 or deny authentication as shown in box 1034 if the gateway cannot authenticate the token or credentials. The gateway will decide to authenticate if the provided token or credential is valid. The token or credential may become invalid because it either has expired or otherwise has been revoked. If authentication is denied, the user will be directed to the AS and the process in 10A can be repeated, as shown in 1036.

If the gateway authenticates the use, then in box 1030, the gateway checks to see if the authenticated user is authorized to perform the connection to the gateway and what actions they are authorized to perform. If the user is not allowed to connect to the gateway, access is denied as in box 1038. However, if the authenticated user is authorized to connected to the gateway, the gateway will use user role information and provide access corresponding to the authority for the authenticated user's role. For example, once the gateway authenticates the use, the gateway can retrieve user role information that is provided to the gateway during the commissioning of the gateway, from another server in communication with the gateway that has an active list of roles and authorities, the like, or combinations thereof. The user role information can be a database that links the user's name or credentials to a predefined role, and links the role to authorized actions. The authorized actions can be different depending on the role, for example, the user may be an operator of an edge asset connected to the gateway and the only authorized actions the use has is to control the edge asset, or the user may be an administrator for just the gateway, and the only authorized action the user can perform is to do with management of the gateway but not control of equipment, or the user can be a full administrator and can control edge assets connected to the gateway as well as the gateway. Other roles and access limits can be used depending on the specifics required.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method comprising:
    receiving, at a computing device, a token, wherein the token comprises a cryptographically signed list of rights or actions that the computing device is authorized to perform;
    requesting, using the computing device, an action of a receiving device in an industrial location, wherein requesting the action involves sending the token as part of a request from the computing device, wherein a signature included in the token is checked against a cryptographic key to ensure the signature and list of the token are valid and selectively authorize the computing device to perform the action; wherein the computing device initiates connections to a trusted external network, and wherein trusted locations are listed in the computing device and also in an enterprise firewall in a remote network to which a plurality of computing devices are connected; and
    determining, using at least the receiving device, whether the computing device is associated with an authorized user of locally connected networks at the industrial location.

2. The method of claim 1, wherein the token is received, at the computing device, from an information technology (IT) network using a high-bandwidth connection before the computing device enters the industrial location.

3. The method of claim 1, wherein the request is sent from the computing device over a low-bandwidth connection after the computing device enters the industrial location.

4. The method of claim 1, wherein the receiving device is a gateway and the computing device is a user device.

5. The method of claim 1, wherein the token contains information about a predetermined set of privileges for each user, and the computing device is configured to identify the user and allow or prevent an action request for the receiving device based on the predetermined set of privileges and identified user.

6. The method of claim 1, comprising, upon a determination that the computing device is not associated with an authorized user, the receiving device causes the computing device to utilize an external service to authenticate the computing device.

7. The method of claim 6, comprising, upon a determination that the computing device is associated with the authorized user, determining, using at least the receiving device, whether the computing device is connected to at least one of the locally connected networks.

8. The method of claim 7, wherein upon a determination that the computing device is not connected to the at least one of the locally connected networks, utilizing external-storage-based authentication.

9. The method of claim 7, wherein upon a determination that the computing device is connected to the at least one of the locally connected networks, allowing access to the receiving device by the computing device when a certificate is deemed valid.

10. The method of claim 7, wherein upon a determination that the computing device is connected to the at least one of the locally connected networks, utilizing external-storage-based authentication when the certificate is not deemed valid.

11. A system configured to provide security at an edge, wherein the system comprises:
    a computing device configured to support authentication and role-based authorization for users, applications, and receiving devices; wherein the role-based authorization comprises accessing user mapping and matching an assigned role for an identified user to be authorized via the computing device;
    wherein the authentication processes comprise at least one of a connected scenario, a disconnected scenario, and a WI-FI-based access;
    wherein the computing device is also configured to determine environment parameters at the edge and use the environment parameters to dynamically adapt authentication processes for the users; and wherein the computing device is an edge gateway and comprises a containerized structure that includes native security measures, third-party managed security services, and monitoring solutions installed thereon.

12. The system of claim 11, wherein the third-party managed security services comprise a software-based firewall.

13. The system of claim 12, wherein the containerized structure configures the computing device to connect with enterprise-based security solutions and to provide a platform for security services.

* * * * *